United States Patent [19]

Trout

[11] 4,137,770
[45] Feb. 6, 1979

[54] ELECTRONIC THERMOSTAT

[75] Inventor: Philip A. Trout, Silver Spring, Md.

[73] Assignee: The United States of America as represented by the Secretary of the Navy, Washington, D.C.

[21] Appl. No.: 858,779

[22] Filed: Dec. 5, 1977

[51] Int. Cl.$^2$ ............................................. G01K 7/14
[52] U.S. Cl. .............................. 73/362 AR; 323/75 F
[58] Field of Search ................... 73/362 AR, 362 SC; 323/68, 75 N, 75 F, 75 H

[56] References Cited

U.S. PATENT DOCUMENTS

| | | | |
|---|---|---|---|
| Re. 27,458 | 8/1972 | Simonyan et al. | 73/362 SC |
| 2,864,053 | 12/1958 | Woodworth | 323/69 |
| 3,420,104 | 1/1969 | Troemel et al. | 73/362 |
| 3,512,167 | 5/1970 | Weinstein | 346/33 |
| 3,783,692 | 1/1974 | Hansen | 73/362 AR |
| 3,817,104 | 6/1974 | Sapin | 323/75 H X |
| 3,831,042 | 8/1974 | LaClaire | 73/362 AR X |
| 3,832,902 | 9/1974 | Usami et al. | 73/362 AR |
| 3,914,671 | 10/1975 | Morton et al. | 323/68 X |
| 3,943,434 | 3/1976 | Haeusler et al. | 73/362 AR X |
| 4,000,454 | 12/1976 | Brakl | 323/75 N |
| 4,002,964 | 1/1977 | Gordon | 323/68 X |
| 4,023,094 | 5/1977 | Adams | 73/362 AR X |

Primary Examiner—Charles Gorenstein
Attorney, Agent, or Firm—R. S. Sciascia; A. L. Branning; G. J. Perry

[57] ABSTRACT

A silicon junction diode is used as one element of a resistance bridge to form the temperature sensing element of an electronic thermostat. Current through the diode is maintained at approximately constant value so that the negative temperature coefficient characteristic of the diode can be utilized. The values of the fixed resistors in the bridge are selected so as to provide a null at a preselected temperature. Used in conjunction with a voltage comparator circuit having positive feedback, a digital control signal is provided whenever the temperature of the sensing element rises above the preselected null value. The addition of a single NOR gate allows the combination of this digital control signal with an external control signal.

4 Claims, 2 Drawing Figures

ELECTRONIC THERMOSTAT

BACKGROUND OF THE INVENTION

The present invention relates generally to the field of electronic temperature sensing and control and more particularly to temperature sensing by the use of electrical bridge networks. More particularly, the present invention relates to the combination of temperature sensing electrical bridge networks with circuitry providing digital control signals used to actuate machinery or equipment.

Thermostats used to control the operation of machinery and equipment have generally been designed around a mechanical means for temperature sensing This mechanical means usually takes the form of a bimetallic strip configured in such a manner that expansion or contraction of the strip would trigger a mechanical switch. With repeated industrial use, the contacts of such switches tend to deteriorate and malfunction. Applicant's electronic thermostat however contains no mechanical parts to deteriorate or malfunction and provides increased stability dispite repeated shock, vibration, and aging. Because the controls for most machinery and equipment now use standard digital logic levels, applicant's electronic thermostat has been designed to provide a standard logical "on" signal when the temperature of the sensor rises above a preselected value.

Although resistor bridge networks and even those including one of more diodes have been used for the linear measurement of temperature, such diode bridge networks have not been combined with the necessary circuitry to produce the digital control signals necessary to produce an electronic thermostat.

SUMMARY OF THE INVENTION

Accordingly, the present invention provides an electronic thermostat capable of generating a digital control signal. This control signal is provided by combining a temperature sensing resistive bridge utilizing the negative temperature coefficient property of a silicon junction diode with a voltage comparator circuit and NOR gate in a positive feedback arrangement. This arrangement provides for a digital control signal to be generated and latch "on" in the presence of a temperature exceeding some predetermined threshold value. The amount of hysteresis in the On-Off switching points may be controlled by choice of a feedback resistor value. Furthermore, the use of a NOR gate and positive feedback allows the control signal generated by this electronic thermostat to be combined with a control signal from some external source, such as a time delay circuit. This combination allows applicant's invention to be used in situations requiring the coincidence of two or more events before switching is to occur. Normally one of these events will be a temperature rising above some preselected value and the other will be a period of time having elapsed.

The temperature sensing element is a resistive bridge having four legs, one of which is a silicon junction diode. The diode is forward biased with an approximately constant current source so that the voltage drop across it is a function of temperature. The values of the constant resistors in the other three legs are chosen to produce a bridge null at a predetermined temperature. The opposite nodes bridge outputs are coupled to the positive and negative inputs of a voltage comparator so that the output of the comparator will become positive when the voltage at the positive input of the comparator exceeds the voltage at its negative input. A resistor is connected between the output of the voltage comparator and its positive input port to produce positive feedback and a latching effect.

To combine the control signal generated by this electronic thermostat with an external control signal, a NOR gate is interposed between the output of the voltage comparator and the feedback resistor. In order to correct polarity, the feedback is connected in this configuration to the negative input port of the voltage omparator. The voltage comparator output will serve as one input to this NOR gate and the external control signal, typically from a time delay circuit, will serve as the second input to this gate. The gate's output will then register "on" only when both the external control signal and the control signal generated by the temperature bridge in combination with the voltage comparator are present.

OBJECTS OF THE INVENTION

It is therefore an object of the present invention to provide an electronic thermostat.

A further object of the present invention is to provide an electronic thermostat using no moving parts.

Another object of the present invention is to provide an electronic thermostat capable of withstanding shock, vibration, and aging.

Still another object of the present invention is to provide an electronic thermostat that will provide a digital control signal that will latch "on" when the temperature being measured exceeds a predetermined value.

Yet another object of the present invention is to provide an electronic thermostat, the control signal from which can be combined with a control signal generated externally.

BRIEF DESCRIPTION OF THE DRAWINGS

Other objects and many of the attendant advantages of the present invention will be readily apparant as the invention becomes better understood by reference to the following detailed description with the appended claims, when considered in conjunction with the accompanying drawings, wherein:

DESCRIPTION OF THE PREFERRED EMBODIMENT

Figure 1:
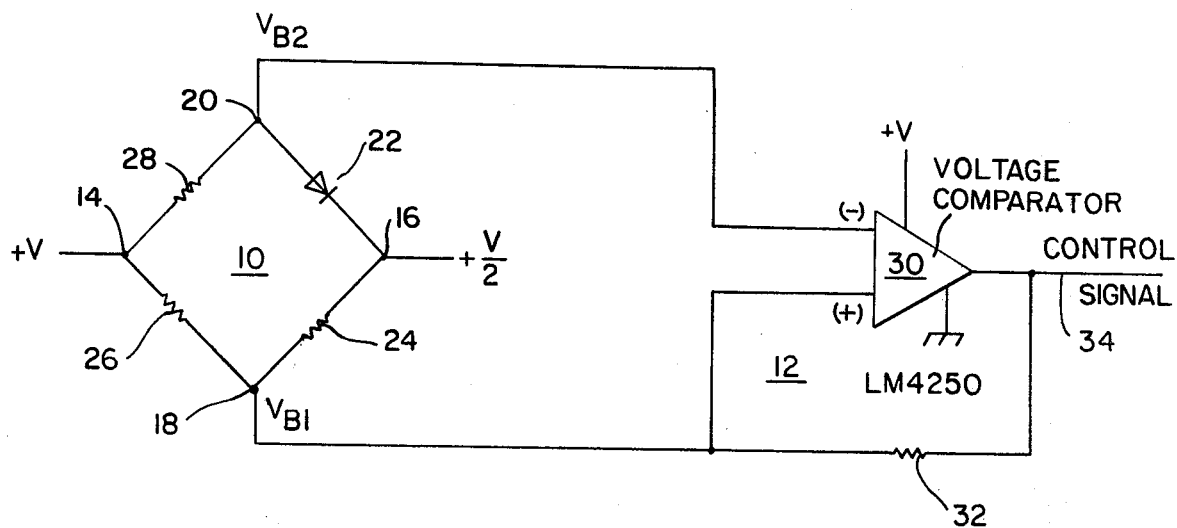
FIG. 1 is a schematic diagram of the electronic thermostat circuit, according to the present invention.

Referring now to the drawings wherein like reference characters designate like or corresponding parts throughout, FIG. 1 is a schematic diagram of the electronic thermostat circuit according to the present invention. The thermostat contains a temperature sensing means 10 with a positive feedback voltage comparator circuit 12 for generating and latching "on" a digital control signal in response to a temperature rise above a preselected value.

Temperature sensing means 10 is an electrical resistance bridge having four legs 22, 24, 26, 28 and four nodes 14, 16, 18, 20. Node 14 joins leg 26 with 28; node 16 joins leg 22 with 24; node 18 joins leg 24 with 26; and node 20 joins leg 28 with 22. Input voltage is applied to the bridge at nodes 14 and 16 and bridge output is taken from nodes 18 and 20.

Temperature sensing occurs by virtue of the negative temperature coefficient property of the silicon junction diode in leg 22 of bridge 10. Current through this diode is maintained at approximately constant value by supplying this current from a voltage source and series resistor (not shown), the voltage source being of much greater potential than the voltage drop across the diode. Current is supplied so that the diode will be forward biased to take advantage of its negative temperature coefficient. The voltage drop across the diode in leg 22 of branch 10 will be an inverse function of the temperature of its junction.

After the voltage-temperature characteristic range of the diode at the operating current is selected, the values of the three resistors in legs 24, 26, and 28 are selected to make the output voltage Vb1 at node 18 equal to the output voltage Vb2 at node 20 at the desired switching temperature. These resistor values are calculated so that a supply voltage V is applied to node 14 and one half of the supply voltage (V/2) is applied to node 16 to produce equivalent voltage outputs at nodes 18 and 20 at the desired switching temperature.

A voltage comparator circuit 12 coupled to the output ports of temperature bridge 10 provides a digital control signal output suitable for interfacing with external circuitry machinery or equipment. The heart of voltage comparator circuit 12 is a voltage comparator 30 having positive and negative input port. The negative input port is coupled to node 20 of bridge 10 such that output voltage Vb2 will appear at this negative input port to the comparator. The positive input port of voltage comparator 30 is coupled to node 18 of bridge 10 such that output voltage Vb1 will appear at this positive input port. A resistor 32 coupled from the output 34 of voltage comparator 30 back to its positive input port forms a positive feedback path for voltage comparator circuit 12. Careful selection of the value of this resistance controls the hysteresis associated with on-off switching. The voltage comparator is powered by the same power supply voltage V that powers input port 14 of temperature bridge 10.

In voltage comparator circuit 12 as described and depicted in FIG. 1, its output 34 will be high, nearly at the supply voltage V, when its positive input terminal is at a more positive voltage than that at its negative input terminal. When the voltage at its negative input port is more positive than at its positive input terminal, the comparator output 34 is at or near 0 volts. Positive feedback resistor 32 produces a fast comparator switching action thereby simulating the closing of the switch contact of a conventional bimetallic thermostat. It also provides a hysteresis switching effect for the combined temperature sensing bridge 10 and comparator circuit 12.

Figure 2:
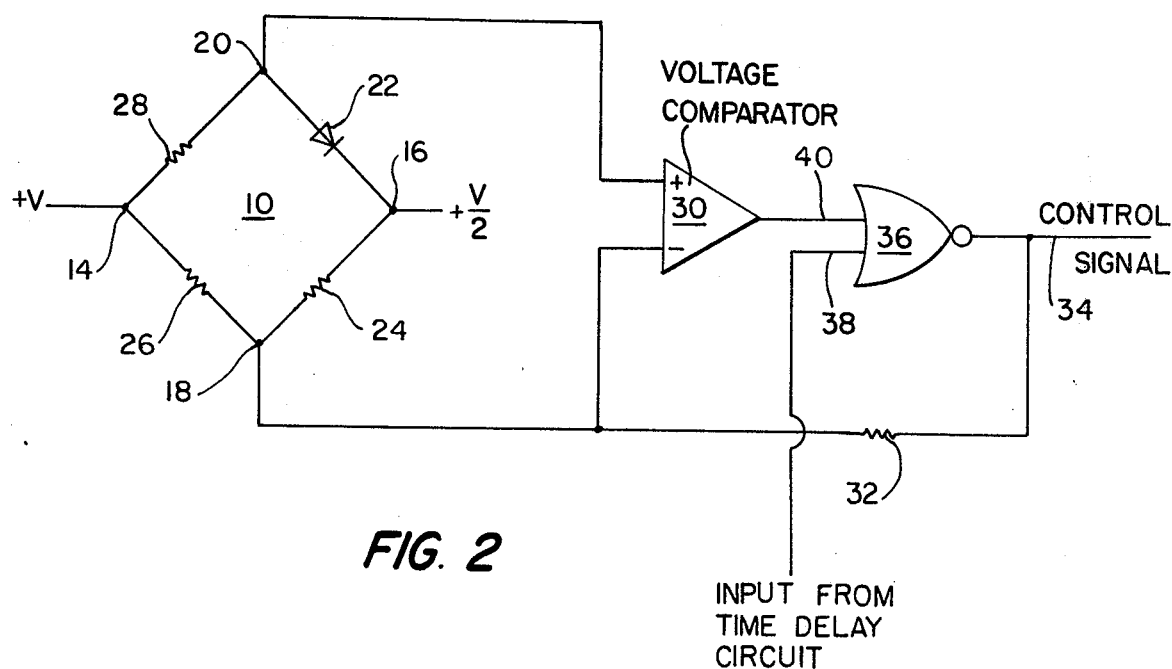
FIG. 2 is a schematic diagram of the electronic thermostat having inverted output and incorporating a control signal from an external source.

Referring now to FIG. 2, the configuration of the basic electronic thermostat is slightly altered so that its digital control output 34 can be combined with a digital control signal from an external source (not shown). A NOR gate is inserted between the output of voltage comparator 30 and the feedback resistor 32 such that the output of voltage comparator 30 serves as one of the two inputs 40 to NOR gate 36. The other input 38 to NOR gate 36 serves as the input for an external control signal typically from a digital time delay circuit. The output of the electronic thermostat in this configuration becomes the output of NOR gate 36 and feedback resistor 32 couples the output of NOR gate 36 to the negative input port of voltage comparator 30. This more sophisticated configuration provides an inverted output from the configuration shown in FIG. 1 which is useful in implementing logic functions such as an "AND" gate made from positive logic "NOR" gate.

Therefore, it is apparant that there has been provided an electronic thermostat capable of delivering a digital control signal whenever the temperature being sensed rises above a certain preselected value. The combination of temperature sensing bridge 10 with voltage comparator circuit 12 provides not only a thermostat having no moving parts, but one that reliably provides a fast switching hysteresis type output.

Obviously, other embodiments and modifications of the present invention will readily come to those of ordinary skill in the art having the benefit of the teachings presented in the foregoing description and the drawings. It, therefore, to be understood that this invention is not to be limited thereto and that said modifications and embodiments are intended to be included within the scope of the appended claims.

What is claimed and desired to be secured by Letters Patent of the United States is:

1. An electronic thermostat for providing a digital control signal whenever the temperature rises above a first threshold level and for removing said control signal whenever the temperature drops below a second threshold level comprising:
    a temperature sensing bridge circuit having a forward biased silicon junction diode as one of its element and having two output ports;
    a voltage comparator circuit having input ports coupled to said bridge output ports and having an output port; and
    a positive feedback path from said voltage comparator circuit to an input of said voltage comparator circuit for latching said control signal.

2. An electronic thermostat for providing a digital control signal whenever the temperature rises above a first threshold level and for removing said control signal whenever the temperature drops below a second threshold level comprising:
    a temperature sensing bridge circuit having a forward biased silicon junction diode as one of its elements and having two output ports;
    a voltage comparator circuit having positive and negative inputs coupled to said bridge output ports and having an output port; and
    a NOR gate having first and second input ports and an output port, said first input port coupled to said output port of said voltage comparator, said second input port coupled to an external control signal, and said output port resistively coupled to said negative input of said voltage comparator.

3. An electronic switching thermostat comprising:
    a first temperature sensing bridge branch having first and second bridge terminals comprising a first constant resistor of preselected value;
    a second bridge branch having first and second terminals comprising a second constant resistor of preselected value, said first terminal of said second bridge branch coupled to said second terminal of said first branch;
    a third bridge branch having first and second terminals comprising a third constant resistor of preselected value, said first terminal of said third branch coupled to said second terminal of said second bridge branch;

a fourth bridge branch comprising a semi-conductor diode having an anode terminal and a cathode terminal, said anode terminal coupled to said first terminal of said first bridge branch and said cathode terminal coupled to said second terminal of said third bridge branch;

means for supplying a first constant voltage to the junction of said second terminal of said first bridge branch with said first terminal of said second bridge branch;

means for supplying a second constant voltage to the junction of said second terminal of said third bridge branch with said cathode terminal of said diode;

a voltage comparator having positive and negative inputs and an output, said negative input coupled to said first terminal of said first bridge branch and said anode terminal of said diode and said positive input coupled to said second terminal of said second bridge branch and said first terminal of said third bridge branch; and a fourth constant resistor having preselected value coupling said output of said comparator with said positive input of said comparator thereby providing a positive feedback for said comparator allowing the voltage at said output to rise to a high level and latch when the temperature of said diode rises above a first threshold level and fall back to a low level when the temperature falls below a second threshold level.

4. An electronic thermostat comprising:

a first temperature sensing bridge branch having first and second bridge terminals comprising a first constant resistor of preselected value;

a second bridge branch having first and second terminals comprising a second constant resistor of preselected value, said first terminal of said second bridge branch coupled to said second terminal of said first branch;

a third bridge branch having first and second terminals comprising a third constant resistor of preselected value, said first terminal of said third branch coupled to said second terminal of said second bridge branch;

a fourth bridge branch comprising a semi-conductor diode having an anode terminal and a cathode terminal, said anode terminal coupled to said first terminal of said first bridge branch and said cathode terminal coupled to said second terminal of said third bridge branch;

means for supplying a first constant voltage to the junction of said second terminal of said first bridge branch with said first terminal of said second bridge branch;

means for supplying a second constant voltage to the junction of said second terminal of said third bridge branch with said cathode terminal of said diode;

a voltage comparator having positive and negative inputs and an output, said negative input coupled to said first terminal of said first bridge branch and said anode terminal of said diode and said positive input coupled to said second terminal of said second bridge branch and said first terminal of said third bridge branch;

a NOR gate having first and second input ports and an output port, said first input port coupled to said output of said voltage comparator and said second input coupled to an external control signal; and a fourth constant resistor having preselected value coupling said output of said comparator with said negative input of said comparator thereby providing a feedback for said comparator allowing the voltage at said output to rise to a high level and latch when the temperature of said diode rises above a first threshold level and fall back to a low level when the temperature falls below a second threshold level.

* * * * *